UNITED STATES PATENT OFFICE.

KALMAN HEINDLHOFER, OF SPRINGFIELD, MASSACHUSETTS.

HIGH-SPEED ROLLER-BEARING.

1,332,176.  Specification of Letters Patent.  Patented Feb. 24, 1920.

No Drawing.  Application filed July 3, 1919.  Serial No. 308,369.

*To all whom it may concern:*

Be it known that I, KALMAN HEINDLHOFER, a subject of the Emperor of Austria-Hungary, residing at Springfield, in the county of Hampden, State of Massachusetts, have invented certain new and useful Improvements in High-Speed Roller-Bearings; and I do hereby declare the following to be a full, clear, and exact description of the invention, such as will enable others skilled in the art to which it appertains to make and use the same.

The present invention relates to high speed roller bearings with particular reference to the material of the rollers thereof, the phrase "high speed bearing" being intended herein to designate one for a shaft rotating at 3,000 R. P. M. or more for large bearings, and 10,000 R. P. M. or more for small bearings; and the word "roller" being intended herein to cover a ball, cylinder, cone, hyperboloid, or in general any body capable of smoothly rolling under pressure in a raceway.

It has been customary heretofore to use metals for the rollers of roller bearings, and particularly steel, since that metal is capable of supporting heavy loads. It is well known, however, that steel as well as other metal rollers quickly attain a high temperature in a high speed bearing, particularly under heavy load, and increase the friction of the bearing to such an extent as to render it unsatisfactory in operation and even inoperative as a practical matter.

Now I have discovered that solid rollers composed of a hard non-metallic material of considerably lower specific gravity than steel do not attain as high temperatures as steel under similar conditions of speed and load, and operate more satisfactorily in high speed bearings, the word "hard" being used herein as of the order of the hardness of steel in the sense of the Brinell tests. For instance, "bakelite" is a non-metallic material suitable for my purpose. So also hard mineral compounds of considerably lower specific gravity than steel, such as specially hard glass, are suitable; and hard minerals of considerably lower specific gravity than steel, such as agate, quartz, topaz, garnets, emeralds, sapphires and diamonds, are suitable also. The phrase "considerably lower than the specific gravity of steel" is intended herein to include specific gravities up to 5, which covers all the materials hereinbefore specifically mentioned as suitable for my purpose.

Also I have discovered that for materials of a given hardness, those of lower specific gravity are most suitable for my purpose. Of those specifically mentioned, I prefer to use solid rollers of agate, which, besides being inexpensive as compared with some of the others, are about as hard as hardened tool steel and have a specific gravity of only one-third thereof, that is, about 2.5.

While I do not in any sense predicate the essence of my invention on any particular theory explaining the advantage herein set forth for the kinds of materials specified, but rely on the discovery of the unexpected advantages resulting from their use in solid rollers for high speed bearings, I desire to state as follows the best explanation now known to me:

Rollers are subjected at their area of contact with the raceway and shaft with the pressure of the supported load, the pressure due to other factors as belt pull, and the centrifugal force resulting from the rotation of the rollers about the shaft as an axis, which, at high speed, is considerable, especially when the roller is solid and composed of material of the specific gravity of steel. When the summation of these forces effective at the contact surface exceeds the elastic limit of the material comprising the roller, there is a plastic flow of the material resulting in molecular friction within it, and a permanent deformation resulting in increased friction with the raceway and the shaft, thereby increasing the temperature attained by the bearing. Now by decreasing the specific gravity of the material composing the rollers, the centrifugal force acting on the rollers is decreased. In many cases this decrease is sufficient to decrease the total pressure acting on solid rollers at their contact surfaces below their elastic limit, and thus reduce or eliminate the high molecular friction, and the added sliding friction attendant upon deformation.

Furthermore, the sliding friction between like materials, as in the case of steel rollers running in steel raceways, is decreased when the rollers are composed of a material different from the raceway, as agate rollers in a steel raceway. Moreover, the materials specifically mentioned hereinbefore as suitable for my purpose, and particularly agate, have a lower coefficient of heat expansion than metallic material and thus more nearly maintain their original size and shape under temperature changes. Likewise the non-metallic rollers act as electrical and magnetic insulators in electrical machinery and compasses, they eliminate the possibility of annealing effects present in rollers of steel, they may be less subject to corrosive action of substances in the atmosphere of chemical factories and the like, and they give the possibility of reducing the bearing noise and chattering in machine tools, grinders, steam turbines, and other high speed devices.

It is understood, of course, that the diameter and length of the rollers and the raceways therefor are determined in accordance with the load, the speed, the material comprising the rollers and raceways, and other factors generally affecting the design of the present kinds of roller bearings. Where solid agate rollers are used, I prefer to make them of about the size of solid steel rollers for like conditions of load, etc., and to use steel raceways of any suitable form. The rollers may be made in any suitable way, and of course, they should have a smooth and true surface.

By using solid rollers, greater loads may be supported and higher speeds attained without causing excessive temperatures. Furthermore, solid rollers are not subject to the unequal weight distribution possible in hollow rollers.

Whether the non-metallic rollers of my invention are mineral compounds or minerals, I prefer to use solid balls rather than solid cylinders, cones, hyperboloids, etc., and I find generally that the decreased pressure resulting from the use of material of considerably lower specific gravity than steel does, in high speed bearings, increase in an unexpected way the advantages ordinarily claimed for steel balls over steel cylinders, cones, hyperboloids, etc.

It is to be noted carefully that my present invention has to do solely with high speed bearings having solid rollers, and preferably solid balls, composed of hard non-metallic material whether mineral compounds, minerals, or otherwise, of a specific gravity considerably less than steel, for the purpose of decreasing the temperature usual in such bearings and thereby reducing or eliminating, in an unexpected manner, or to an unexpected degree, the objectionable features attendant thereupon in the operation of the present metal roller bearings.

Having thus described my invention, what I claim is:

1. A solid roller for anti-friction bearings, composed of hard non-metallic material of considerably lower specific gravity than steel and having the property of sustaining heavy loads at high speeds.

2. A solid roller for anti-friction bearings, composed of hard mineral compound of considerably lower specific gravity than steel and having the property of sustaining heavy loads at high speeds.

3. A solid roller for anti-friction bearings, composed of hard mineral of considerably lower specific gravity than steel and having the property of sustaining heavy loads at high speeds.

4. In a high speed roller bearing, a raceway, and a plurality of solid agate rollers arranged therein.

5. A solid ball for anti-friction bearings, composed of hard non-metallic material of considerably lower specific gravity than steel and having the property of sustaining heavy loads at high speeds.

6. A solid ball for anti-friction bearings, composed of hard mineral compound of considerably lower specific gravity than steel and having the property of sustaining heavy loads at high speeds.

7. A solid ball for anti-friction bearings, composed of hard mineral of considerably lower specific gravity than steel and having the property of sustaining heavy loads at high speeds.

8. In a high speed roller bearing, a raceway, and a plurality of solid agate balls arranged therein.

In testimony whereof I affix my signature.

KÁLMÁN HEINDLHOFER.